United States Patent [19]

Tesmer et al.

[11] Patent Number: 5,736,187
[45] Date of Patent: Apr. 7, 1998

[54] PROCESS OF MAKING PHENYLALANINE-FREE FOOD FOR INFANTS AND SMALL CHILDREN

[75] Inventors: Erhard Tesmer, Offenburg; Marianne Vetter, Neu-Isenburg; Günther Raffler, Karlstein-Dettingen; Friedrich Schweikhardt, Friedrichsdorf, all of Germany

[73] Assignee: Milupa GmbH & Co. KG, Friedrichsdorf, Germany

[21] Appl. No.: 682,627

[22] PCT Filed: Nov. 27, 1995

[86] PCT No.: PCT/EP95/04671

§ 371 Date: Oct. 9, 1996

§ 102(e) Date: Oct. 9, 1996

[87] PCT Pub. No.: WO96/16559

PCT Pub. Date: Jun. 6, 1996

[30] Foreign Application Priority Data

Nov. 30, 1994 [DE] Germany .............. 44 42 668.2

[51] Int. Cl.⁶ .................. A23L 1/305; A23L 1/304
[52] U.S. Cl. .................. 426/656; 426/74; 426/601; 426/656; 426/658
[58] Field of Search .................. 426/72, 656, 601, 426/74, 658

[56] References Cited

U.S. PATENT DOCUMENTS

| | | | |
|---|---|---|---|
| 5,393,532 | 2/1995 | Wachtel | 426/656 |
| 5,411,757 | 5/1995 | Buist et al. | 426/656 |
| 5,547,687 | 8/1996 | Outinen | 426/656 |

FOREIGN PATENT DOCUMENTS

| | | | |
|---|---|---|---|
| 0 488 078 | 6/1992 | European Pat. Off. . | |
| 0 492 183 | 7/1992 | European Pat. Off. . | |
| 492183 | 7/1992 | European Pat. Off. | 426/801 |
| 40 42 115 C2 | 11/1993 | Germany . | |
| 40 37 447 C2 | 1/1994 | Germany . | |

*Primary Examiner*—Helen Pratt
*Attorney, Agent, or Firm*—Bacon & Thomas

[57] ABSTRACT

A phenylalanine-free nutrient base for infants and small children, sad also a process for the production thereof, are provided. This nutrient base, in addition to an amino acid mixture which has all L-amino acids necessary for the nutrition of the child, except for phenylalanine, also contains fats sad/or carbohydrates sad also, optionally, minerals and/or trace elements. This nutrient base is produced by spray-drying of an aqueous formulation containing these components. During this, at least the amino acids lysine and cystine are at least in part mixed into the spray-dried product obtained after the spray-drying. Owing to the fact that these amino acids are not spray-dried with the others, the end product obtained is free of undesired by-products that form during spray-drying.

11 Claims, No Drawings

PROCESS OF MAKING PHENYLALANINE-FREE FOOD FOR INFANTS AND SMALL CHILDREN

The invention concerns a process for the production of a phenylalanine-free nutrient base for infants and small children, which in addition to an amino acid mixture which has all L-amino acids necessary for the nutrition of the child, except for phenylalanine, also contains fat(s) and/or carbohydrates and also, optionally, minerals and/or trace elements, wherein an aqueous formulation containing these components is spray-dried.

Phenylketonuria (referred to below as PKU) is among the genetically determined diseases, and is a metabolic disorder. For treatment of this metabolic disorder, a child suffering from PKU normally receives a food which contains a limited amount of natural protein and just so much phenylalanine as the child's body needs for building up protein (growth).

However, such a low phenylalanine diet alone would provide the children with too little of all other amino acids, just as important for life. Hence these children are given special products, which are mixtures of L-amino acids or of specific extremely low-phenylalanine proteins or protein hydrolysates. In addition, vitamins, minerals and trace elements are incorporated in these mixtures.

Now the diet of an infant suffering from PKU consists of a bottle-food, which is made up of adapted infant milk-food and/or breast milk and a phenylalanine-free infant nutrient base.

Such a phenylalanine-free nutrient base for infants and small children is known from German patent application P 40 42 115.5 and European patent application EP-A 0 492 138. In these publication, the problems connected with PKU and its treatment are explained in more detail. Reference is thus expressly made to the disclosures of these publications.

In the production of the phenylalanine-free nutrient bases for infants and small children nutrient bases described in the aforesaid two publications, the amino acids, which are mainly used as free acids, together with the other constituents, for example fats and carbohydrates, etc., are incorporated into an aqueous formulation, which is then spray-dried.

In the spray-drying of these known, complete nutrient bases which are based on amino acids, the problem then arose that chemical reactions took place, so that the amino acid analysis of the final product departed from the values theoretically to be expected, and undesired byproducts arose. Hence the aim of the present invention is to provide a process for the production of a nutrient base for infants and small children and such a nutrient base itself which can be obtained by spray-drying, where during this spray-drying as few undesired by-products as possible arise or are formed.

This aim is achieved by the teaching of claim 1 and claim 8 respectively.

It has now surprisingly been found that a phenylalanine-free nutrient base for infants and small children which contains as few by-products as possible can be obtained by spray-drying of an aqueous formulation, if at least the amino acids lysine and cystine are at least in part not spray-dried with this formulation, but are mixed with or added into the spray-dried product later.

According to the invention, the whole amount of the amino acids lysine and/or cystine can be mixed with the already spray-dried product. However it is also possible to add part of the lysine and/or cystine to the wet formulation to be spray-dried, and then only later to mix in the remainder dry. Here the amount of lysine and/or cystine which is added to the wet formulation to be spray-dried should not make up more than 10% of the total amount of lysine and/or cystine used.

Hence it is sufficient according to the invention to "leave out" only one of the two amino acids lysine and cystine during the spray-drying and only later mix it in dry. In this case also, up to 10% of the total amino acid lysine or cystine used can be subjected to the spray-drying process. With this procedure, fewer undesired by-products already arise than in the product according to the state of the technology. Preferably, however, both amino acids lysine and cystine are left out during the spray-drying and only mixed in later.

Further, it is possible to mix small part amounts of one or more of the other amino acids into the spray-dried product. However this part amount should make up not more than 5% of the total amino acid used. Preferably, however, all amino acids except for lysine and cystine are added to the wet formulation to be spray-dried, however during this a small part of the lysine can be added for complexing the metals (e.g. for $Cu(II)SO_4$).

Here the lysine is preferably mixed into the already spray-dried product in the form of the glutamate and thus as lysine glutamate. Hence the glutamic acid is also in part only mixed in after the spray-drying.

If now the amino acids L-cystine and L-lysine are mixed according to the invention after the spray-drying into the product obtained therefrom, then undesired by-products are no longer formed and the amino acid analysis corresponds to that specified.

Also subject matter of the invention is a phenylalanine-free nutrient base for infants and small children, which can be obtained by the process according to the invention and hence can be produced in this way.

The advantages from the nutritional point of view obtainable with the nutrient base obtainable according to the invention correspond to those advantages which are described in EP-A 0 492 138, to which reference is expressly made.

The amino acids can be present in the nutrient base obtainable according to the invention in any suitable form, particularly in any form permissible for foodstuff purposes. Thus the amino acids can for example be present as salts, hydrochloride, hydrates, acetates, and malates, etc. Further, they can be used in the form of glutamates and aspartates. It is also possible to use the amino acids in the form of short-chain peptides, particularly dipeptides, provided that these peptides contain no phenylalanine.

In the nutrient base obtainable according to the invention, the amino acid pattern is preferably matched to that in adapted conventional foods and/or in human milk, the phenylalanine of course being left out of the formula.

As fats, carbohydrates, minerals, trace elements and vitamins, those which were already used in the known phenylalanine-free spray-dried nutrient base can be used. Here the fats can be mixtures of vegetable and/or animal fats and/or oils.

In the production of the aqueous formulation to be spray-dried, the starting point is preferably cold water (8° to 20° C.), in which the amino acids, the carbohydrates, the minerals and/or the trace elements are dissolved, dispersed or emulsified. A fat mixture to be incorporated into the wet formulation is prepared separately, and this is then incorporated or metered into the wet formulation before the spray-drying.

The process according to the invention and the phenylalanine-free nutrient base for infants and small children are explained in more detail in the following example.

1.425 kg cold (15° C.) water are taken, and to this are successively added:

| kg | Component |
|---|---|
| 158.5 | instant starch |
| 449.3 | lactose EP |
| 7.73 | aspartic acid |
| 23.52 | L-glutamic acid |
| 15.98 | L-isoleucine |
| 1.70 | L-leucine |
| 20.13 | L-tyrosine |
| 0.17 | L-proline |
| 12.70 | L-threonine |
| 14.01 | L-serine |
| 11.17 | L-alanine |
| 16.97 | L-valine |
| 6.57 | L-glycine (sic) |
| 6.13 | L-methionine |
| 6.57 | L-histidine |
| 10.06 | L-arginine |
| 4.60 | L-tryptophan |
| 17.47 | calcium carbonate |
| 18.19 | calcium glycerophosphate |
| 17.49 | magnesium L-aspartate |
| 346.9 | MDO2 (maltodextrin degradation level 2) |
| 0.83 | vanillin |

Next this aqueous formulation is heated to 70° C. Then the following minerals, etc., which had previously been dissolved, alone or several at once, in the necessary amount of water, are added:

| kg | Component |
|---|---|
| 1.831 | potassium chloride |
| 10.90 | sodium chloride |
| 0.0012 | potassium iodide |
| 0.0072 | sodium fluoride |
| 15.56 | dipotassium hydrogen phosphate |
| 5.36 | potassium carbonate |
| 1.4851 | sodium carbonate |
| 0.0428 | vitamin C |
| 0.0660 | L-lactic acid |
| 0.4032 | iron-(II) sulphate |
| 0.2436 | zinc sulphate* |
| 0.0304 | copper-(II) sulphate** |
| 0.232 | manganese sulphate*** |
| 0.0020 | sodium molybdate |
| 0.0020 | chromium-(III) chloride |
| 1.092 | taurine |
| 0.1984 | L-carnitine |
| 0.2184 | myoinositol |
| 4.6 | choline hydrogen tartrate |

*The zinc sulphate was dissolved in 5 l water with addition of 0.0376 kg L-histidine and then added.
**The copper-(II) sulphate was dissolved in 5 l water with addition of 0.0396 kg L-lysine and then added.
***The manganese sulphate was dissolved in 5 l water with addition of 0.0380 kg L-histidine and then added.

The amino acids added during the dissolution of the said metal salts are for the purpose of complexing.

The mixture so produced has a volume of ca. 1,600 l.

609 kg fat mixture are added to this aqueous mixture; the preparation of this fat mixture is described below. Next the wet formulation is homogenised (1st stage 150 bar, 2nd stage 50 bar). The wet formulation is then heated to 90° C., again homogenised and dried in a spray-tower. The drying can be carried out with a spray-disc and with nozzles. The wet formulation is preferably dried with nozzles.

| Conditions: | |
|---|---|
| Entry temperature: | 170 to 190° C. |
| Exit temperature: | 85 to 95° C. |
| Nozzle pressure: | 150 to 170 bar |

The product obtained after the spray-drying can be filled into containers.

The following components are added per 400 kg of the product so obtained:

| kg | Component |
|---|---|
| 15.82 | lysine-l-glutamate triturate |
| 1.429 | L-cystine |
| 3.062 | vitamin mix |
| 103.3 | lactose EP |

After this, it is mixed for ca. 20 mins. The finished end product or the nutrient base so produced can then be filled (into containers).

The procedure for the preparation of the above fat mixture is as follows:

565 kg fat (80% palm oil, 10% soya oil (or maize oil), 10% coconut oil) are pumped into a fat mixing tank and heated to 700° C. 8.57 kg pure lecithin and 0.72 kg Tegomuls 90 S (mixture of mono- and diglycerides) are then added and (the mixture) is stirred.

When amino acids are mentioned in the present documents, L-amino acids are meant. Unless otherwise stated, all % statements refer to wt %.

We claim:

1. Process for the production of a phenylalanine-free nutrient base for infants and small children, which in addition to an amino acid mixture which has all L-amino acids necessary for the nutrition of the child except for phenylalanine, also contains fat(s) and/or carbohydrates and also optionally minerals and/or trace elements, wherein an aqueous formulation containing these components is spray-dried, characterised in that:

at least the amino acids lysine and cystine are at least in part mixed dry into the product obtained after the spray-drying.

2. Process according to claim 1, characterised in that:

the amino acids are used in such an amount that with the exception of phenylaianine the amino acid pattern of the product obtained is matched to that in normal adapted foods and/or in human milk.

3. Process according to claim 1, characterised in that:

the components are used in such amounts that the amino acids make up 5–20%, the fats 10–30% and the carbohydrates up to 70%, each based on the dry mass of the product, and that the amount and the nature of the minerals and the trace elements correspond to the recommendations and guidelines for foods for infants and small children.

4. Process according to claim 1, characterised in that:

the components are dissolved, dispersed or emulsified in cold water, and the wet formulation so obtained is heated, homogenised and optionally pasteurised in particular at 70° to 90° C. before spray-drying.

5. Process according claim 1, characterised in that:

the spray-drying is performed in an atomiser equipped with nozzles, with drying and simultaneous agglomeration.

6. Process according to claim 1, characterised in that:

vitamins are also added.

7. Process for the production of a phenylalanine-free nutrient base for infants and small children, which in addition to an amino acid mixture which has all L-amino acids necessary for the nutrition of the child except for phenylalanine, also contains fat(s) and/or carbohydrates and also optionally minerals and/or trace elements, wherein an aqueous formulation containing these components is spray-dried, characterized in that:

at least the amino acids lysine and cystine are at least in part mixed dry into the product obtained after the spray-drying; and the amino acids are mainly used as free acids.

8. Process according to claim 7, characterized in that:

the components are used in such amounts that the amino acids make up 5–20%, the fats 10–30% and the carbohydrates up to 70%, each based on the dry mass of the product, and that the amount and the nature of the minerals and the trace elements correspond to the recommendations and guidelines for foods for infants and small children.

9. Process according to claim 7, characterized in that:

the components are dissolved, dispersed or emulsified in cold water, and the wet formulation so obtained is heated, homogenized and optionally pasteurized in particular at 70° to 90° C. before spray-drying.

10. Process according to claim 6 characterized in that water and fat-soluble vitamins are also added.

11. Process according to claim 6 characterized in that the amino acid is lysine glutamate.

* * * * *